Feb. 8, 1938.   F. J. IRLBECK   2,107,535
SELF STEERING MECHANISM FOR TRACTORS
Filed May 24, 1937
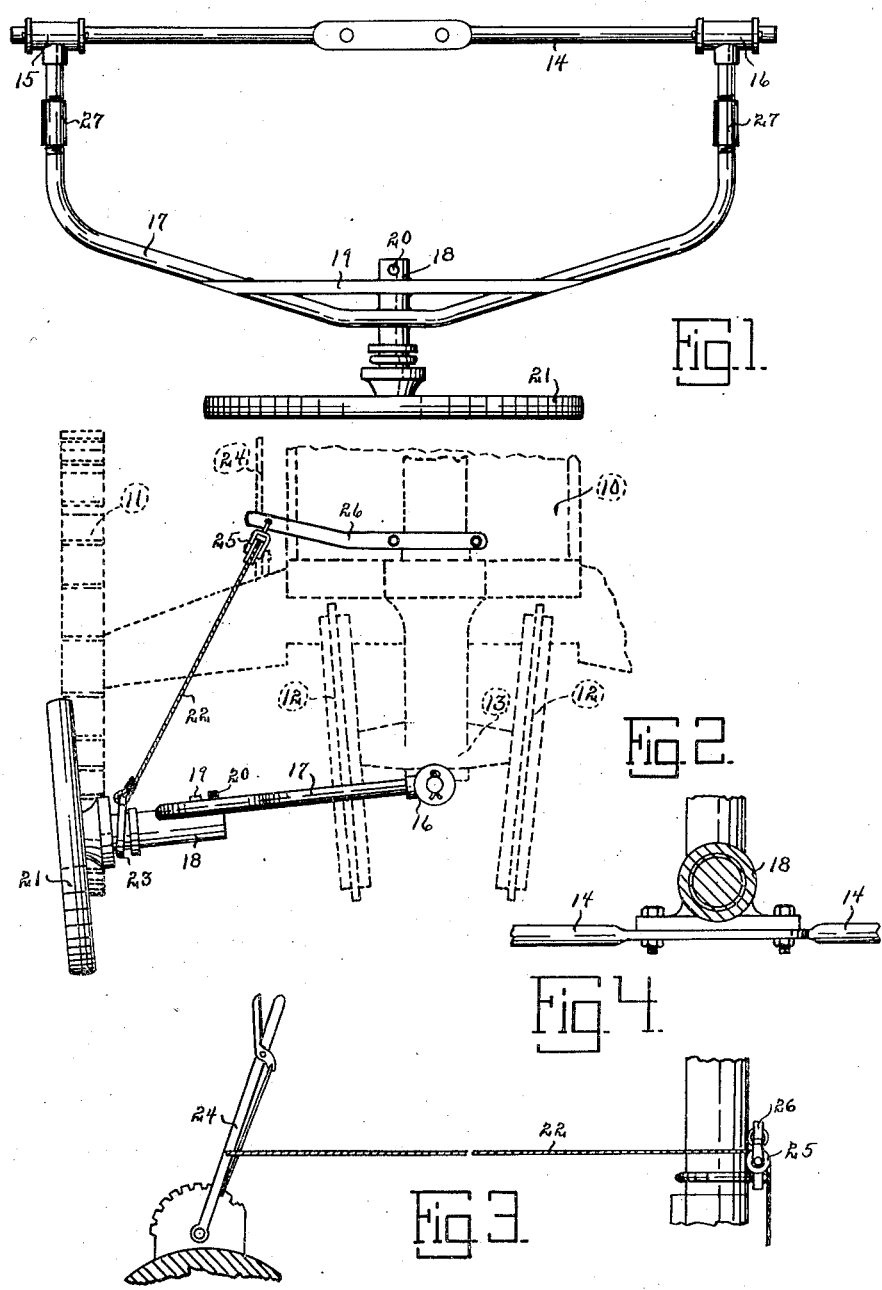
INVENTOR.
F. J. IRLBECK
BY M. Talbert Dick
ATTORNEY.

Patented Feb. 8, 1938

2,107,535

UNITED STATES PATENT OFFICE 2,107,535

SELF-STEERING MECHANISM FOR TRACTORS

Frank J. Irlbeck, Dedham, Iowa

Application May 24, 1937, Serial No. 144,343

3 Claims. (Cl. 97—49)

The principal object of my invention is to provide a steering apparatus for plowing tractors or like that follows the plow furrow of the preceding round, thereby automatically and properly steering the tractor around the field without the steering aid of the operator of the tractor.

A further object of this invention is to provide a self-steering device for tractors that is easily attached to or detached from a tractor.

A still further object of this invention is to provide an automatic steering mechanism for tractors that may be quickly and easily moved to an inoperative position when desired.

A still further object of my invention is to provide a device for steering tractors during plowing that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is a top plan view of my device.

Fig. 2 is a front view of my tractor guiding device and more fully illustrates its construction.

Fig. 3 is a side view of a portion of the means employed for lowering and raising the guiding wheel portion of the device.

Fig. 4 is a side view of a portion of my device illustrating the method of securing it to the steering unit of a tractor.

Plowing with tractors is not only very tiresome, but it is very difficult to keep the tractor in proper spaced relationship to the previous plow furrow. Obviously, the operator must be continuously occupied with this proper guiding of the tractor. One reason for this trouble in properly steering the tractor is that most tractors have their two front wheels very close together and these wheels are required to travel over the unplowed ground some distance from the plow furrow made in the preceding round. I have overcome such objections as will hereinafter be appreciated.

Referring to the drawing, I have used the numeral 10 to designate a tractor having rear wheels 11, and front guiding wheels 12, which are closely spaced apart and rotatably mounted in the hub unit 13 which in turn is horizontally rotatably secured to the tractor frame. It is to such a tractor that I install my device and which I will now describe. The numeral 14 designates a bar detachably secured at its center to the bottom of the hub unit 13 of the tractor by bolts or like as shown in the drawing. This bar extends longitudinally of the tractor when the tractor is traveling in a straight path and is positioned between the two front guiding wheels 12 of the tractor. The numeral 15 designates a bearing member rotatably mounted on the rear end portion of the elongated bar 14.

The numeral 16 designates a similar bearing member rotatably mounted on the forward end portion of the bar 14. The numeral 17 designates a U-shaped beam having one of its ends rigidly secured to the bearing member 15 and its other end rigidly secured to the bearing member 16. The numeral 18 designates a hub rigidly secured to the central portion of the beam 17 as shown in Fig. 1. The numeral 19 designates a strengthening brace secured to the beam 17 and to the hub 18. This hub 18 extends outwardly from the beam 17 and is arranged transversely of the longitudinal axis of the bar 14. The numeral 20 designates a grease fitting in the hub 18. The numeral 21 designates a wheel having its axle rotatably mounted in the hub 18. The beam 17, hub 18, and wheel 21 are so designed and arranged that the wheel 21 will directly precede the right rear wheel 11 of the tractor and be in substantially the same plane as this rear wheel 11 as shown in Fig. 2. As the wheel 21 is designed to travel in a plow furrow while the two front wheels 12 of the tractor travel over the unplowed ground, the bottom plane of the wheel 21 will be substantially below the bottom plane of the two tractor wheels 12.

Obviously, when my device is so secured to a tractor pulling a plow or plows, the wheel 21 of my device will travel in the furrow made by the last plow in the preceding round. The tendency of this wheel 21 will be to follow this track or furrow made by the plow and in following this furrow it will rotate the bar 14 and U-shaped beam 17 in a horizontal plane secured to and relative to the direction or directions taken by the furrow in which the wheel 21 functions. As the hub unit of the tractor wheels 12 is rigidly secured to the bar 14, when the bar 14 is rotated in a horizontal plane by the action of the wheel 21 following the furrow, the front guiding wheels 12 of the tractor will be accordingly guided, thereby successfully steering the tractor without the attention of the operator of the tracor.

Although in the drawing I show my wheel 21 in alignment with the rear right wheel of the tractor, obviously the wheel 21 may be positioned at any desired distance from the front wheels 12 of the tractor depending upon the distance it is desired that the tractor be from or relative to the furrow made by the preceding round of the tractor or plow.

By the beam 17 having its two ends vertically rotatably mounted on the bar 14, the wheel 21 may move upwardly or downwardly independently of the tractor as it passes over uneven ground without affecting in any way its steering function. Another advantage of this rotatable mounting of the beam 17 to the bar 14 is that when desired the wheel 21, hub 18, and beam 17 may be swung upwardly to an inoperative position with the wheel 21 free of engagement with the earth. In the drawing, I show this control of the device by cable 22 having one end secured to a ring 23 on the hub 18 and its other end secured to an ordinary lockable lever 24 secured to the frame of the tractor and positioned in the vicinity of the operator of the tractor. The numeral 25 designates a pulley wheel through which the cable extends and which is secured to the front end portion of the tractor by a bracket 26. By this arrangement the cable extends first upwardly and inwardly from the hub 18 and then rearwardly to the lever 24. To place the device in an inoperative condition it is merely necessary for the operator to move the lever 24 to the rear. To place the device in an operative condition the operator moves the lever 24 forwardly to permit the wheel 21 to contact the ground. The weight of the wheel 21, hub 18 and beam 17 are sufficient to hold the wheel 21 in proper frictional contact with the ground.

The upward and downward movement of the U-shaped beam 17 does not interfere with the right front wheel 12 of the tractor as the two end portions of the beam extend in spaced relationship to the front and rear of the wheel respectively. Obviously, my device is adaptable to any type of tractor by adjustment of the U-shaped beam 17 to give desired clearance. I have accomplished this by having the threaded ferrules 27 imposed in each leg of the U-shaped beam 17 so that it may be lengthened or shortened as desired to fit the various types of tractors.

Some changes may be made in the construction and arrangement of my improved self-steering mechanism for tractors without departing from the real spirit and purpose of my invention, and it is my intention to cover by my claims any modified forms of structure or use of mechanical equivalents which may be reasonably included within their scope.

I claim:

1. In combination with a tractor having two front guiding and supporting wheels, an auxiliary steering apparatus comprising a horizontal bar operatively connected near its center to said guiding wheels, a U-shaped member having its two ends vertically rotatably mounted on said bar, and a wheel rotatably mounted on and near the center portion of said U-shaped member.

2. In combination with a tractor having two front guiding and supporting wheels, an auxiliary steering apparatus comprising a horizontal bar operatively connected near its center to said guiding wheels, a U-shaped member having its two ends vertically rotatably mounted on said bar, and a wheel rotatably mounted on and near the center portion of said U-shaped member spaced apart from and embracing one of said guiding wheels.

3. In combination with a tractor having two front guiding and supporting wheels, an auxiliary steering apparatus comprising a horizontal bar operatively connected near its center to said guiding wheels, a U-shaped member having its two ends vertically rotatably mounted on said bar, a wheel rotatably mounted on and near the center portion of said U-shaped member spaced apart from and embracing one of said guiding wheels, and a means for lowering and raising the central portion of said U-shaped member.

FRANK J. IRLBECK.